Aug. 30, 1966
C. W. HATCHER
3,269,775
MACHINE FOR CUTTING GROOVES OF CONSTANT DEPTH IN PAVEMENT
Filed June 6, 1963
5 Sheets-Sheet 1
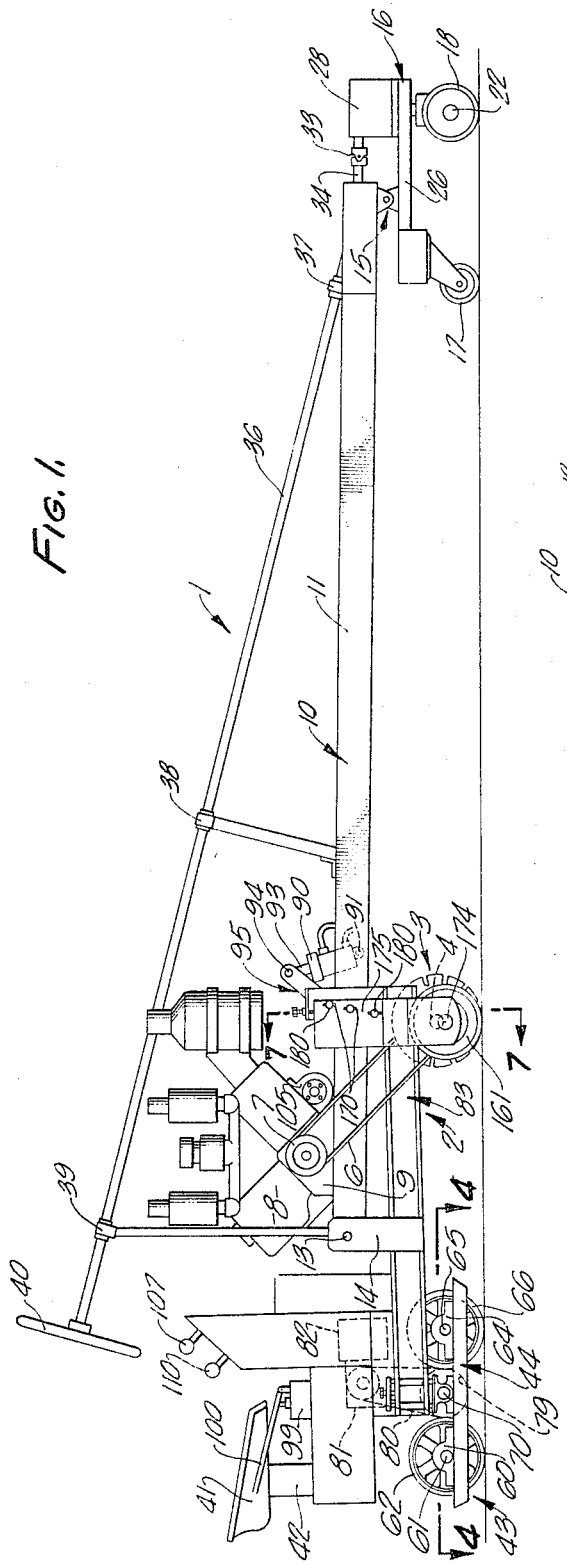
INVENTOR.
CECIL W. HATCHER
BY W. E. Beatty
ATTORNEY

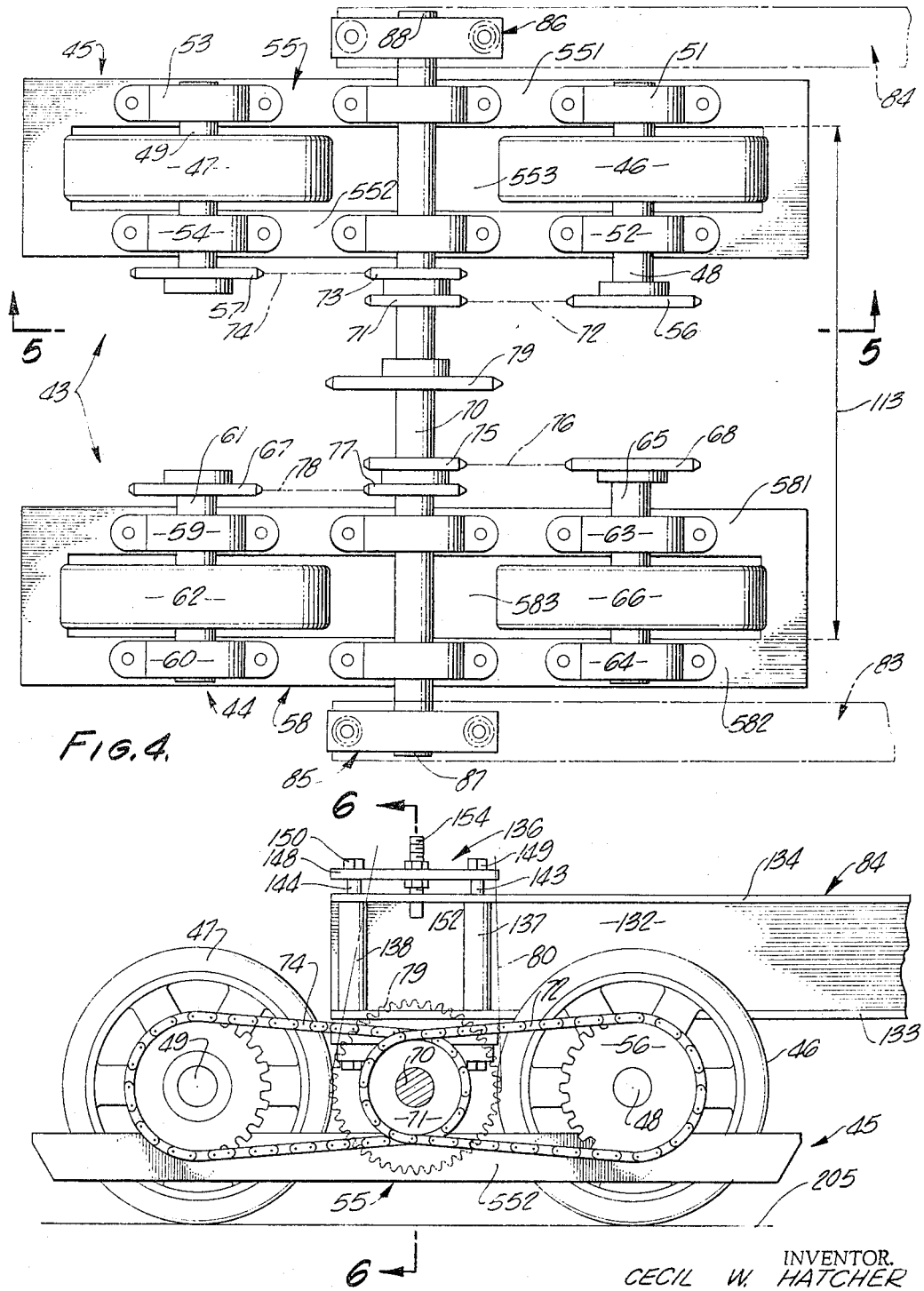

Aug. 30, 1966    C. W. HATCHER    3,269,775
MACHINE FOR CUTTING GROOVES OF CONSTANT DEPTH IN PAVEMENT
Filed June 6, 1963    5 Sheets-Sheet 3

INVENTOR.
CECIL W. HATCHER
BY
W. E. Beatty
ATTORNEY

INVENTOR.
CECIL W. HATCHER
BY W. E. Beatty
ATTORNEY

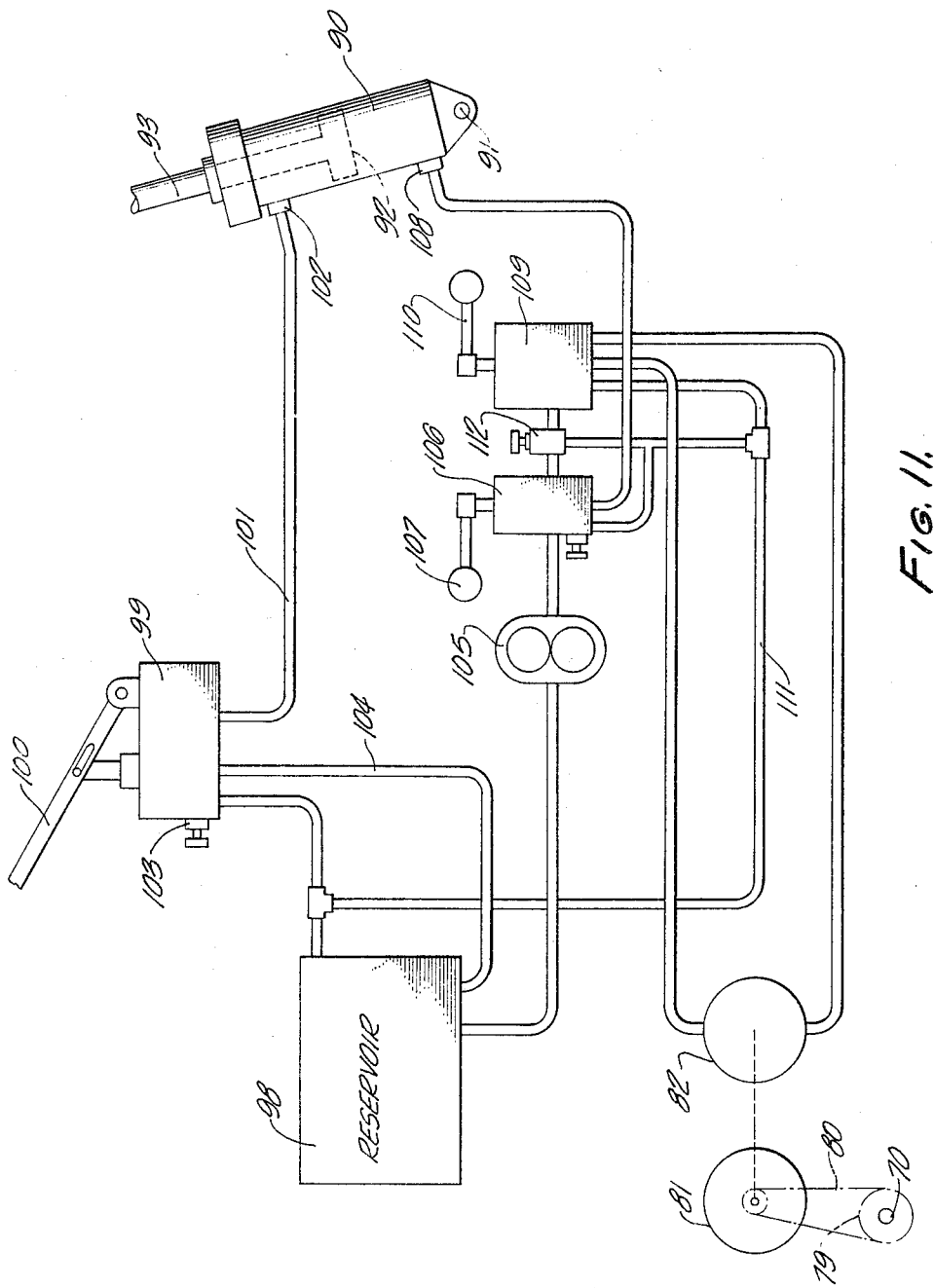

United States Patent Office 3,269,775
Patented August 30, 1966

3,269,775
MACHINE FOR CUTTING GROOVES OF
CONSTANT DEPTH IN PAVEMENT
Cecil W. Hatcher, West Covina, Calif., assignor to
Concut, Inc., El Monte, Calif., a corporation of
California
Filed June 6, 1963, Ser. No. 286,032
8 Claims. (Cl. 299—39)

The invention relates to a machine for cutting grooves of constant depth in pavement, and more particularly it relates to a self-propelled vehicle having rotatable abrasive wheels for cutting grooves of constant depth, while leaving parallel uncut portions or ridges of substantial width serving as an anti-skid surface for the concrete paving of highways, aircraft landing fields and the like.

The present invention is an improvement on the earlier form of concrete cutting machine disclosed and claimed in the following United States patents:

No. 2,990,660, July 4, 1961, referred to herein as patent A;
No. 3,007,687, Nov. 7, 1961, referred to herein as patent B;
No. 3,087,712, April 30, 1963, referred to herein as patent C;
No. 3,087,712, April 30, 1963, referred to herein as patent D.

The patents B, C and D relate to a bump cutter, the end product being a paving which may or may not have ridges, depending on whether the ridges appearing in FIG. 11 of patent B are so thin that they are broken off by the vibration of the machine or removed by subsequent passes of the machine. Such ridges, if present, appeared only where there was a bump in the paving, the level stretches of the paving not being acted on by the cutter head. Patent D is for an improved steering control wherein the cutter head, as in patents B and C is supported on an intermediate portion of the extension frame.

Patent A discloses and claims a feature employed in the present invention, namely, the location of the cutter shaft in the vertical plane of the axis of the bearing supports for vehicle wheels. The present invention relates to a number of improvements over the abrading machine of patent A as follows:

(1) *An improved steering control.*—While this resembles the steering control of patents C and D, it differs therefrom in omitting the limitation of the downward movement of the cutter head by stop screws 104 in FIG. 1 of patent C or 66 and 67 in FIG. 9 thereof, to the end that the vertical position of the cutter head is free from control by the extension frame, being controlled only by wheels or rollers which follow the irregularities in the pavement in order to cut grooves and ridges of constant depth at all places along the pavement.

(2) *An improved wheel support for the cutter head.*— In the patent A, the wheels 51 in FIG. 3 are small, being limited in size as they were located under the cutter shaft. According to the present invention, the axis of wheels like 51 in patent A are arranged for rotation on an axis in the vertical plane of the cutter shaft, without being located under the cutter shaft and without such limitation as to size. This is accomplished by providing an outboard bearing support for the wheels to locate them beyond the ends of the cutter shaft and its driven pulley.

(3) *An improved support for adjusting the height and inclination of the cutter shaft with respect to the vehicle frame and its wheels.*—This is accomplished by driving the vehicle with a rear truck having a drive shaft and supporting the rear end of the main frame carrying the cutter shaft on adjustable universal bearings supported on such drive shaft, means also being provided for adjusting the opposite sides of the front of the vehicle frame and its cutter shaft with respect to adjacent vehicle wheels. These adjustable supports at the opposite sides of the front and rear of the vehicle frame provide a four point adjustment for the height and inclination of the cutter shaft.

For further details of the invention, reference may be made to the drawings wherein FIG. 1 is a view in side elevation of a groove cutting machine according to the present invention.

FIG. 2 is an enlarged sectional view on line 2—2 of FIG. 3.

FIG. 3 is a sectional view on line 3—3 of FIG. 2.

FIG. 4 is an enlarged sectional view on line 4—4 of FIG. 1.

Figure 6:
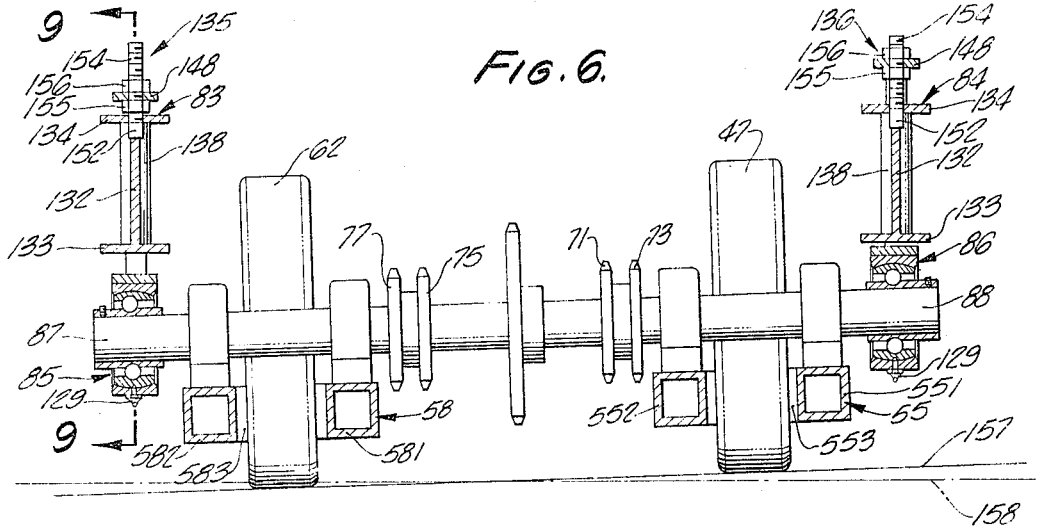
Figure 7:
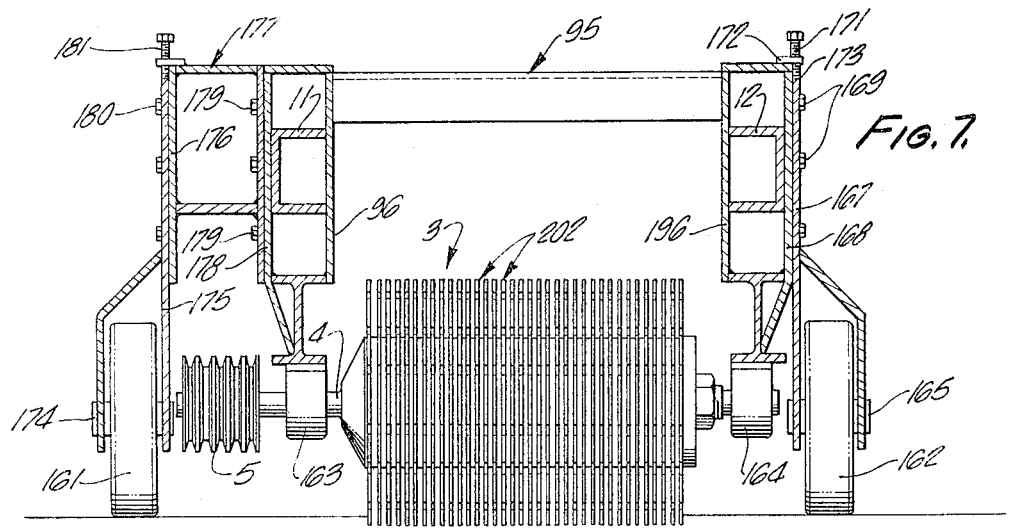
Figure 8:
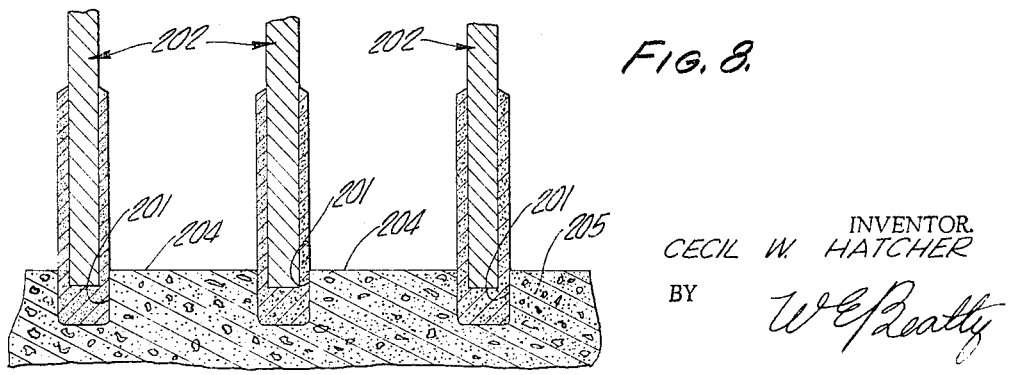

FIG. 5 is a sectional view on line 5—5 of FIG. 4.
FIG. 6 is a sectional view on line 6—6 of FIG. 5.
FIG. 7 is a sectional view on line 7—7 of FIG. 1.
FIG. 8 is an enlarged longitudinal sectional view of the cutter head with parts broken away, in cutting position on concrete paving.

Figure 9:
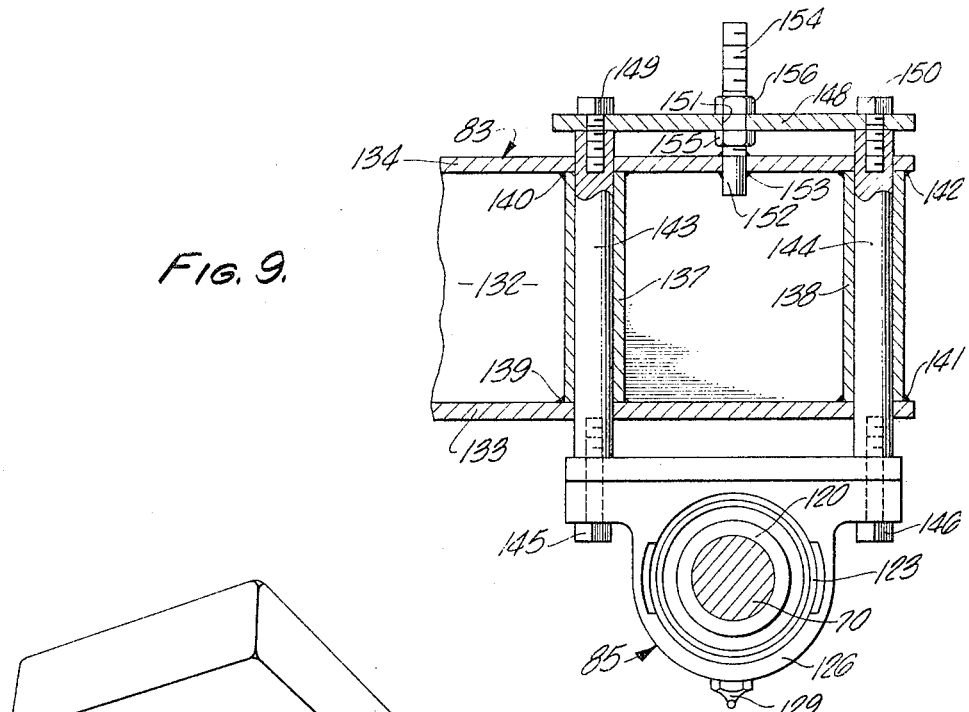
Figure 10:
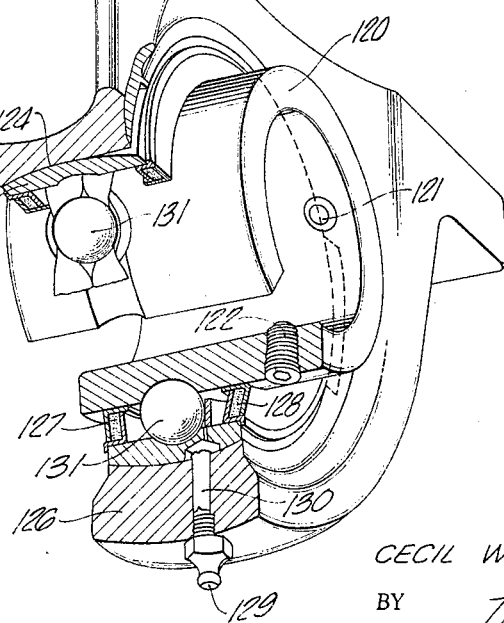

FIG. 9 is a sectional view on line 9—9 of FIG. 6.
FIG. 10 is an enlarged perspective view of one of the universal bearings, with parts broken away.

FIG. 11 is a flow diagram of the hydraulic control mechanism employed in connection with the invention.

Certain features disclosed herein are disclosed and claimed in copending applications as follows.

The features of a truck frame at each side of the rear of the vehicle frame and a support for the rear of the vehicle frame on the drive shaft for the rear truck are the subject of application S.N. 150,039 filed November 3, 1961, now Patent No. 3,195,957, issued July 20, 1965, for Bump Cutter With Means for Reducing Effect of Bumps. S.N. 272,413, filed April 11, 1963, now Patent No. 3,201,173, issued August 17, 1965, is a division of S.N. 150,039 and discloses and claims the feature of the front end of the extension frame having a hinge connection with a front truck intermediate its caster wheel and steering wheel. S.N. 272,414, filed April 11, 1963, now Patent No. 3,208,796, issued September 28, 1965, is also a division of S.N. 150,039 and discloses and claims a hydraulic cylinder and control for snubbing or holding down the cutter to its work, or for raising the cutter head from its work. S.N. 150,039 also discloses and claims the feature of a hinge support for the rear of the vehicle frame on the drive shaft for the rear truck.

Referring in detail to the drawings, the vehicle 1 has a vehicle or main frame 2 at the front end of which is rotatably mounted a cutter head 3 on a cutter shaft 4 having a pulley 5 connected by belt 6 to the pulley 7 on the engine 8. As shown in FIGS. 7 and 8, cutter head 3 comprises a series of abrasive discs 202 on the cutter shaft 4 with separators for leaving a series of ridges 204 in the pavement 205. These ridges are of constant depth and are useful for preventing skidding of an automobile, particularly when the pavement is wet. These ridges may have dimensions given later.

In FIG. 1, the engine 8, as shown at 9, is mounted on the rear end of an extension frame 10. Extension frame 10, as shown in FIG. 3, has opposite arms 11 and 12, being somewhat U shaped. The rear end of the extension frame 10 has a hinge connection 13 on a horizontal axis, with an upright post 14 at each side of the vehicle frame 2, one of these posts being shown in FIG. 1 at 14.

The front end of extension frame 10 has a hinge connection 15 on a horizontal axis with the front truck 16 which has a rear caster wheel 17 and a front wheel 18 for steering. The hinge connection 15 includes suitable bearings 19 on the frame 10, the bearing 20 on the truck 16 and a hinge pin or shaft 21.

The front wheel 18 has an axle 22, see FIG. 2, carried by a bracket 23 fixed to a vertical shaft 24 having a bearing 25 on the body 26 of the truck and a further bearing 27 in a housing 28 fixed to the body 26.

The shaft 24 at its upper end has a worm wheel 29 meshing with a worm 30 rotatably supported on a horizontal axis by bearings 31 and 32 carried by the housing 28. The worm 30 is connected by a universal coupling 33 to a short steering rod section 34, the latter having a connection through the universal coupling 35 with the front end of the inclined steering rod 36. Steering rod 36 has bearing supports on the extension frame 10 as indicated at 37, 38 and 39. The rear end of extension rod 36 has a handle or steering wheel 40 accessible to an operator for whom a seat 41 is provided, this seat being mounted as shown at 42 on the vehicle frame 2.

The extension frame 10 provides a steering control but has no control on the height of the cutter head 3 as the stop screws in FIGS. 1 and 9 of patent C are omitted. The height of the cutter head, to the end that grooves and ridges of uniform depth are provided, is controlled solely by arranging the cutter head 3 and the front wheels 161, 162, of the vehicle frame for rotation on axes in the same vertical plane, as described above.

The rear of the vehicle frame 2 is supported by a rear truck 43 which is composed of two truck members 44 and 45 arranged side by side at opposite sides of the rear of the vehicle, see FIG. 4.

Truck member 45 has front and rear driven wheels 46 and 47 having axles 48 and 49 having bearing supports 51, 52 and 53, 54 on the truck frame 55. Frame 55 has opposite sides 551, 552 and a central opening 553 for wheels 46, 47. Axle 48 has a sprocket 56 and axle 49 has a sprocket 57. Similarly, the other truck member 44 has a truck frame 58 having opposite sides 581, 582 and a central opening 583 for the wheels 62, 66. Truck frame 58 has bearings 59 and 60 for axle 61 of rear driven wheel 62, and bearings 63, 64 for the axle 65 of front driven wheel 66. Axle 61 has a sprocket 67 and axle 65 has a sprocket 68.

A drive shaft 70 extends across the middle of both of the truck members 44 and 45 having a sprocket 71 connected by chain 72 to sprocket 56, also having a sprocket 73 connected by chain 74 to sprocket 57, also having a sprocket 75 connected by a chain 76 to sprocket 68, a sprocket 77 connected by chain 78 to sprocket 67, and a central sprocket 79 connected by chain 80, see FIG. 4, to a gear box 81, see FIGS. 1 and 11, which is driven by the hydraulic motor 82. Gear box 81 and hydraulic motor 82 are mounted on the main frame 2, at the rear thereof, above the drive shaft 70.

In FIG. 4, the line 113 represents the width of the cutter head and shows that the width of the cutter head 3 in an axial direction is greater, viz., 24 inches, than the width to the outside edges of the wheels of truck 43, viz., 23 inches. The wheels of the truck 43 thus ride on the path cut by the cutter head 3.

The vehicle frame 2 has laterally spaced side arms 83 and 84, see FIG. 4, the rear ends of which are supported by universal bearings 85 and 86 on the opposite ends 87 and 88 of the drive shaft 70 which thus serve as a hinge connection for the rear end of the vehicle frame 2, at a horizontal axis intermediate the front and rear wheels of the truck members 44 and 45. Both the hinge connection just described for the rear end of vehicle frame 2 and the use of individual truck members 44 and 45 contribute to reducing the effect on the cutter head 3 of bumps encountered by the rear truck 43 as the vehicle moves in a forward direction.

As shown in FIGS. 4, 6, 9 and 10, the bearings 85 and 86 are similar and are similarly adjustably connected to the respective side arms 83, 84 of the main frame. Each of the bearings 85, 86 includes the bearing shown in FIG. 10, the inner race 120 being connected to the shaft 70 by set screws 121, 122. The outer race 123 has a convex spherical periphery 124 which fits the spherical inner surface of the housing 126. The bearing has a series of balls indicated at 131 and opposite seals 127, 128. Each bearing has a hydraulic grease fitting 129 and a lock pin 130 which locates the lube hole and limits rotation of the outer bearing race 123 in the housing 126. The races 120 and 123 are self-aligning in any direction without distortion of the seals 127, 128.

While the bearing shown in FIG. 10 has been adapted to the purposes of the present invention, this bearing is a well known Sealmaster bearing made and sold by others. As shown in FIGS. 4, 6 and 9, the arms 83, 84 are in the form of an I beam, each having an upright central web 132 and end flanges 133 and 134. An adjustable stop 135 and 136 is provided for supporting each arm 83, 84 on its respective bearing 85, 86. As shown in FIG. 9, the web 132 is removed to make room for a pair of cylindrical sleeves 137 and 138 welded at their opposite ends to the flanges 133 and 134 as shown at 139 and 140 for sleeve 137 and at 141, 142 for sleeve 138. These sleeves serve as slide bearings for cylindrical slides 143 and 144 which are secured by bolts 145 and 146 at their lower ends to the base 147 of the bearing housing 126, being secured at their upper ends to a bar 148 by bolts 149 and 150. Bar 148 acts as a hanger for arm 83, having an aperture 151 through which passes a post 152 welded to flange 134 as shown at 153. Post 152 has threads 154 to receive nuts 155 and 156 which are adjustably threaded to a desired position to support the arm 83 at the required height. Thus the wheels 47, 62, see FIG. 6, may ride on the paving at one level as shown by line 157 while the cutter head is inclined to the level 157 as shown by line 158. It will be noted that if the upper nuts 156 of the stops 135 and 136 are loosened so that the bars 148 can float vertically between the lower nuts 155 and the upper nuts 156, the main frame 2 can float differentially relative to the two sets of rear wheels 46, 47 and 62, 66 to insure that all such wheels will remain in contact with the pavement when the cutter head 3 engages pavement having a different lateral inclination than the pavement engaged by the rear wheels. Or, both of the stops 135 and 136 may be operated to raise or lower both arms 83, 84 to adjust the slack in the chain 80.

As shown in FIGS. 1 and 11, a hydraulic cylinder 90 has a hinge connection 91 with the extension frame 10. Cylinder 90 has a piston 92 and plunger 93 having a hinge connection 94 with an inverted U shaped bracket 95 fixed to the vehicle frame 2.

Bracket 95 has hollow vertical arms 96 and 196 which arise from and are fixed to the respective side arms 83, 84 of the vehicle frame 2. Arms 96 and 196 of bracket 95 provide a slidable coupling with and house side arms 11, 12 of extension frame 10, permitting relative vertical movement of the frames 2 and 10, but causing the frame 2 and its cutter head 3 to move transversely with the extension frame 10 for steering purposes.

The arms 83, 84 respectively carry bearings 163, 164 for the cutter shaft 4. Wheel 162 has a bearing 165 carried by a bracket 166 the inner side of which is a flat plate 167 which fits against the flat outer side 168 of arm 196, being fixed in adjusted vertical position by bolts like 169 which pass through upright elongated slots like 170, see FIG. 1 which shows such slots for the bracket 175 for the other wheel 161. Adjustment of the height of cutter shaft 4 with respect to wheel 162 is facilitated by a stop screw 171 having threaded engagement with bracket 172 on top of arm 196 to engage the upper edge 173 of plate 167. Similarly, wheel 161 has a bearing 174 carried by a bracket 175, similar to bracket 166. Bracket 175 is adjusted in vertical position against the side 176 of an inverted U shaped spacer bracket 177, secured to the outer side 178 of arm 96 by bolts 179. The wheel bracket 175 is adjusted in vertical position by bolts like 180 which have upright elongated slots 170, see FIG. 1. Bracket 175 also has an adjustable stop screw 181 like screw 171, described above.

As shown in FIG. 7, the wheel brackets 175 and 166 are fixed to the bracket 95 and support the wheels 161 and 162 outwardly of the outer ends of the cutter shaft 4, and outwardly of the pulley 5. The belt 6 extends from the pulley 5 at an angle, as shown in FIG. 1, free from obstruction by the spacer bracket 177.

As described in connection with FIG. 11, means are provided for supplying hydraulic pressure to the opposite ends of cylinder 90, to either raise the cutter head 3, or to use the weight of engine 8 as a buttress to snub the cutter head 3 and hold it to its work.

As shown in FIG. 11, a suitable reservoir 98 is provided for the hydraulic fluid. Hand pump 99, having operating handle 100 which is at the operator's position adjacent seat 41, see FIG. 1, supplies pressure over the line 101 to the snubber inlet 102. The adjustable relief or bleed valve 103 is provided for relief and fine control of the pressure in the line 101. Line 104 is an inlet from the reservoir 98 to pump 99.

The hydraulic gear pump 105, see FIGS. 1 and 11, is suitably driven by the engine 8, and supplies fluid under pressure for operating the hydraulic motor 82 and for raising the cutter head 3. Valve 106 having handle 107 at the operator's position adjacent seat 41, see FIG. 1, controls pressure to or from inlet 108. Valve 109 having handle 110 at the operator's position at the rear of the machine, as shown in FIG. 1, controls pressure from pump 105 to motor 82 with the usual return 111 to the reservoir 98. When valve 106 is in neutral the pressure line from pump 105 is continued through relief valve 112 to the valve 109. Relief valve 112, like valve 103, provides a fine control for the fluid pressure supplied to the inlet 108.

A section of a concrete highway was cut with grooves as shown in FIG. 8. On a rainy day, a passing automobile skidded on an uncut section of the highway and with the car somewhat out of control, the skidding continued until the car reached the section having grooves as in FIG. 8, whereupon the grooves in the pavement stopped the uncontrolled sidesway and the car swung into alignment with the grooves, which extended lengthwise of the highway, with the car under full control of the driver. The side walls of the grooves act as abutments to resist sidesway of the tires. For example, the grooves 201 in the paving 205 may be ⅛ inch wide and deep, with ⅜ inch spacers between the adjacent saw blades or discs 202.

While I have herein shown and described my invention in what I have conceived to be the most practical and preferred embodiment, it is recognized that departures may be made therefrom within the scope of my invention which is not to be limited to the details disclosed herein but is to be accorded the full scope of the claims so as to embrace any and all equivalent devices.

I claim:

1. A concrete cutting machine comprising a vehicle having a frame, a truck having a truck frame having bearings thereon for axles having front wheels and rear wheels respectively, said vehicle frame having a rear end supported by and terminating in a hinge connection with said truck frame intermediate its said front and rear wheels, a cutter shaft carried by the front of said vehicle frame, said vehicle frame having front wheels having bearing supports for rotation on an axis in a vertical plane containing the axis of said cutter shaft, a motor on said vehicle frame for said cutter shaft, an extension frame having a rear end having a pivotal connection with an intermediate portion of said vehicle frame, said extension frame having a front end having a front wheel means, means for slidably coupling the front of said vehicle frame with an intermediate portion of said extension frame, said coupling means providing for vertical movement of said cutter shaft under control of the front wheels of said vehicle frame independently of said extension frame while connecting the front of said vehicle frame and said extension frame for steering movement together in a transverse direction, and a steering control for the front wheel means of said extension frame.

2. A concrete cutting machine according to claim 1, said coupling means comprising an inverted U-shaped bracket having opposite arms each having a vertical box frame, said extension frame having side arms each slidably housed for vertical movement in one of said box frames.

3. A concrete cutting machine according to claim 2, each of the bearing supports for the front wheels of said vehicle frame having an upright support and means for securing each of said last mentioned supports to one of said box frames.

4. A concrete cutting machine according to claim 3, and means for adjusting the vertical position of each arm of said bracket with respect to its associated upright support to adjust the depth of cut, and cutters on said cutter shaft.

5. A concrete cutting machine for paving comprising a vehicle having a main frame having opposite sides, said frame having a transversely extending cutter head shaft, an engine for driving said shaft, front wheels and rear wheels for said main frame, and separate means providing an adjustable support for each side of the front and rear of said main frame, said front wheels having bearing supports supporting said front wheels for rotation on an axis in a vertical plane containing the axis of said shaft, a rear truck having a truck frame, said rear wheels being front and rear driven wheels of said truck, and a drive shaft for said truck wheels, means providing a hinge connection between the rear of said main frame and said drive shaft, said hinge connection including a universal bearing between said drive shaft and each of the opposite sides of said main frame.

6. A concrete cutting machine according to claim 1, and a hydraulic cylinder between said extension frame and the front of said vehicle frame for raising or lowering said cutter shaft.

7. In a pavement grooving machine, the combination of:
 (a) a frame;
 (b) two wheel means supporting said frame for moveement over pavement to be grooved;
 (c) each of said wheel means including components spaced apart transversely of the direction of movement of said frame;
 (d) two independently adjustable connecting means spaced apart transversely of the direction of movement of said frame for vertically adjusting the positions of said transversely spaced components of one of said wheel means relative to said frame;
 (e) rotary grooving means carried by said frame and spaced longitudinally from said one wheel means in the direction of movement of said frame and rotatable about an axis extending transversely of said frame;
 (f) said transversely spaced components of the other of said wheel means being connected to said frame and being rotatable about an effective transverse axis substantially in the same transverse vertical plane as the axis of rotation of said rotary grooving means; and (g) means on said frame for driving said one wheel means and said rotary grooving means.

8. A pavement grooving machine as defined in claim 7 wherein said transversely spaced components of said one wheel means respectively comprise wheel frames pivotable relative to said frame about a transverse axis and each including tandem wheels rotatable about transverse axes.

References Cited by the Examiner

UNITED STATES PATENTS

| | | | |
|---|---|---|---|
| 2,349,949 | 5/1944 | Farrell | 299—39 |
| 2,736,544 | 2/1956 | Wright | 299—39 |
| 2,935,308 | 4/1960 | Zorn | 299—86 |
| 3,063,690 | 11/1962 | Cornell | 299—39 |
| 3,087,712 | 4/1963 | Hatcher | 299—39 |

ERNEST R. PURSER, *Primary Examiner.*

BENJAMIN HERSH, CHARLES E. O'CONNELL, *Examiners.*